(12) United States Patent
Maner et al.

(10) Patent No.: US 12,093,340 B1
(45) Date of Patent: Sep. 17, 2024

(54) AUTOMATED KEYWORD IDENTIFICATION AND AI ASSISTED RETAIL DETAIL PAGE KEYWORD CONTENT ENGINE

(71) Applicant: DetailPage, LLC, South Jordan, UT (US)

(72) Inventors: Justin J. Maner, Auburn, WA (US); Spencer J. Millerberg, South Jordan, UT (US)

(73) Assignee: DetailPage, LLC, South Jordan, UT (US)

( * ) Notice: Subject to any disclaimer, the term of this patent is extended or adjusted under 35 U.S.C. 154(b) by 0 days.

(21) Appl. No.: 18/529,646

(22) Filed: Dec. 5, 2023

Related U.S. Application Data

(60) Provisional application No. 63/495,520, filed on Apr. 11, 2023.

(51) Int. Cl.
  *G06F 16/958* (2019.01)
  *G06F 16/951* (2019.01)

(52) U.S. Cl.
  CPC .......... *G06F 16/972* (2019.01); *G06F 16/951* (2019.01)

(58) Field of Classification Search
  CPC .. G06F 16/951; G06F 16/907; G06F 16/9538; G06F 16/95; G06F 16/972; G06F 3/04843; G06F 40/166
  See application file for complete search history.

(56) References Cited

U.S. PATENT DOCUMENTS

| | | | | |
|---|---|---|---|---|
| 7,979,386 | B1* | 7/2011 | Sholtis | G06Q 30/02 707/603 |
| 2009/0037399 | A1* | 2/2009 | Bartz | G06F 16/36 707/999.005 |
| 2009/0299998 | A1* | 12/2009 | Kim | G06F 16/951 707/999.005 |
| 2014/0164097 | A1* | 6/2014 | Stoikovitch | G06Q 30/0243 705/14.42 |
| 2015/0006333 | A1* | 1/2015 | Silveira | G06Q 30/0641 705/27.1 |
| 2017/0371954 | A1* | 12/2017 | Kikuchi | G06F 16/334 |

OTHER PUBLICATIONS

Syndigo LLC, "Syndigo Announces Additional Generative AI Capabilities to its Client Platform", https://syndigo.com/news/syndigo-announces-additional-generative-ai-capabilities-to-its-client-platform/, Mar. 27, 2023, 5 pages.

* cited by examiner

*Primary Examiner* — Wilson W Tsui
(74) *Attorney, Agent, or Firm* — Dorsey & Whitney LLP

(57) ABSTRACT

Described herein are embodiments to automate the process to update content on a webpage. A system may select a seed keyword based on an item on a webpage. From that seed keyword, the system may generate a keyword universe based on historic search data. The system may use the keyword universe to rewrite the content currently on the webpage.

20 Claims, 10 Drawing Sheets

| ASin | Brand | Product | Category | Subcategory | Title | Bullet | Description | Hidden |
|---|---|---|---|---|---|---|---|---|
| B079VP6DH5 | Brand A | | | | Brand A Paper Towels, White, 20 Family Rolls = 60 Regular Rolls, Select-A-Size, Paper Towels | 1- Get more for your money with Brand A Paper towels in bulk! This pack includes 16 family rolls, equivalent to 40 regular rolls  2- Choose Brand A Paper Towels for a superior clean. These rolls are more absorbent, picking up messes quicker than ordinary leading brands  3- Perfect for households with in need of bulk paper towels | Introducing the Brand A Paper Towels in a bulk pack of 20 family rolls, which is equivalent to 60 regular rolls. These top-quality household supplies are perfect for all your cleaning needs.  With its various size rolls, you can now customize the sheet size according to the size of your mess. | bulk paper towels, kitchen paper towels |

AUTOMATED KEYWORD IDENTIFICATION AND AI ASSISTED RETAIL DETAIL PAGE KEYWORD CONTENT ENGINE

TECHNICAL FIELD

This application relates generally to user interfaces and systems for automated keyword discovery, grading, visualization and content generation on a webpage, including automated rewriting of detail page content using a computational retail SEO algorithm, competitive keyword lists, artificial intelligence engines, and prompts, connections, APIs and engineering to create relevant content for products, brands, and retailers.

BACKGROUND

When shopping on retailer sites, many people assume a brand's product description is used to educate the potential customer about the product. This is largely false as only 6% of customers read the product description. The description is, however, extremely useful to get a customer to a product page, a term known as "page traffic". To drive traffic, brands must use search terms that customers use in the retailers search bar. After a customer enters the search term, retailers use a process called "pairwise data" that links search terms to individual product pages. The pages are indexed by computer systems to match to those terms, thereby allowing for a rapid return of the product pages most closely associated with those keywords. Because retailers such as Walmart™, Amazon™, Home Depot™, etc. do not share the exact details of their search algorithms, brands have a very difficult time knowing what keywords customers use to reach products and therefore what terms are needed within product detail page descriptions and titles. This creates a barrier to optimizing content needed to drive search algorithms, and most brands/sellers do not have systems or technical expertise needed to optimize for this purpose.

Furthermore, retail SEO is dramatically different from web SEO, due to the use of historical product purchase behavior in the search ranking equation. Retailers use this data to surface the most relevant products to a customer, along with further ranking data from "exact match" or "phrase match" keywords. Exact match will return pages higher in search, where phrase match will return lower. To best work with retailer search systems, brands must have a significant amount of knowledge of past customer behavior and anticipated changes over time.

Two main areas of technology can be used to assist with the process (1) Computational algorithms and (2) Artificial intelligence (AI). Computational algorithms may be used to refine the multitude of behavioral and search data outlined previously into that data that is most essential and impactful for the given product or SKU. The concept of algorithms has a long history, dating back to ancient civilizations. The word "algorithm" can be traced back to the 9th century when it was coined by the Persian mathematician Abdullah Muhammad bin Musa al-Khwarizmi, who is often referred to as "The Father of Algebra. In recent years, algorithms have become more powerful due to increased computer processing power, allowing for advanced analysis on vast data sets. Algorithms require human intervention to write the initial algorithm, then allowing the algorithm (or mathematical process) to run again and again to solve similar related problems.

Artificial Intelligence (AI) may also be used to streamline processes. The history of AI can be traced back to the early days of computing, when researchers began to explore the possibility of creating machines that could think for themselves. In the 1950s, a group of scientists at Dartmouth College coined the term "artificial intelligence" and held a conference to discuss the field. In the years that followed, AI research made significant progress, with computers being able to perform tasks that were once thought to be impossible for machines.

With the opening of inexpensive access to AI technology, the variety of applications has also increased. AI is being used to develop self-driving cars, virtual assistants, and medical diagnostic tools. It is also being used to improve the performance of a wide range of products and services, from online search engines to fraud detection systems. Embodiment disclosed herein provide specific and dedicated applications in the content generation field.

In some cases, neither AI, nor algorithms would be sufficient by themselves, rather, the combination of the two methods may be used to produce the desired result.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 illustrates an example output of the detail page optimizer in accordance with some embodiments.

DETAILED DESCRIPTION

To maximize search visibility a description of a product must be optimized. This requires extensive keyword research, competitive analysis, structuring of the description, and incorporation of keywords. Embodiments herein provide systems and methods for automatically creating a universe of keywords customized to each individual stock keeping unit (SKU) requested for relevance and search volume based on seasonality, competitive set, and previous customer search history. After the optimized keyword set is determined, artificial intelligence languages and prompts based on the keyword set may be used to suggest rewritten retail detail pages, titles, bullets, descriptions, and hidden keywords.

The disclosed embodiments have a number of advantages over current systems. Some advantages of the embodiments herein include: (1) automation of keyword generation, initial content rewrite, measurement, and visualization to the user, not requiring the integration of multiple systems; (2) identification of useful keywords for the user across platforms using the SKU number and a single seed keyword to perform research necessary (e.g., provide a simple user input with zero keyword research needed by the user); (3) an increase in keywords that can be indexed by retailer systems for a given SKU; (4) improvement of the visibility of products in search results; (5) an increased search traffic to the most pertinent detail pages (6); automatic updates to keyword possibilities for seasonality and customer intent; (7) improvement to customer shopping experience with products more applicable to their needs; (8) rewritten content put in a format ready for upload to retailer site or integration via Application Programming Interface (API) to digital asset management (DAM) systems; (9) a reduction in human labor required for increasing traffic which has an extremely high correlation to increasing sales; and (10) a reduction in pay-per-click (PPC) costs by increasing organic keyword traffic; and (11) inclusion of multiple languages for important keywords, allowing foreign customers to search the detail pages efficiently. Embodiments herein may help customers by mirroring their language in description content so they know when they have found exact matches to their searches.

Figure 1:
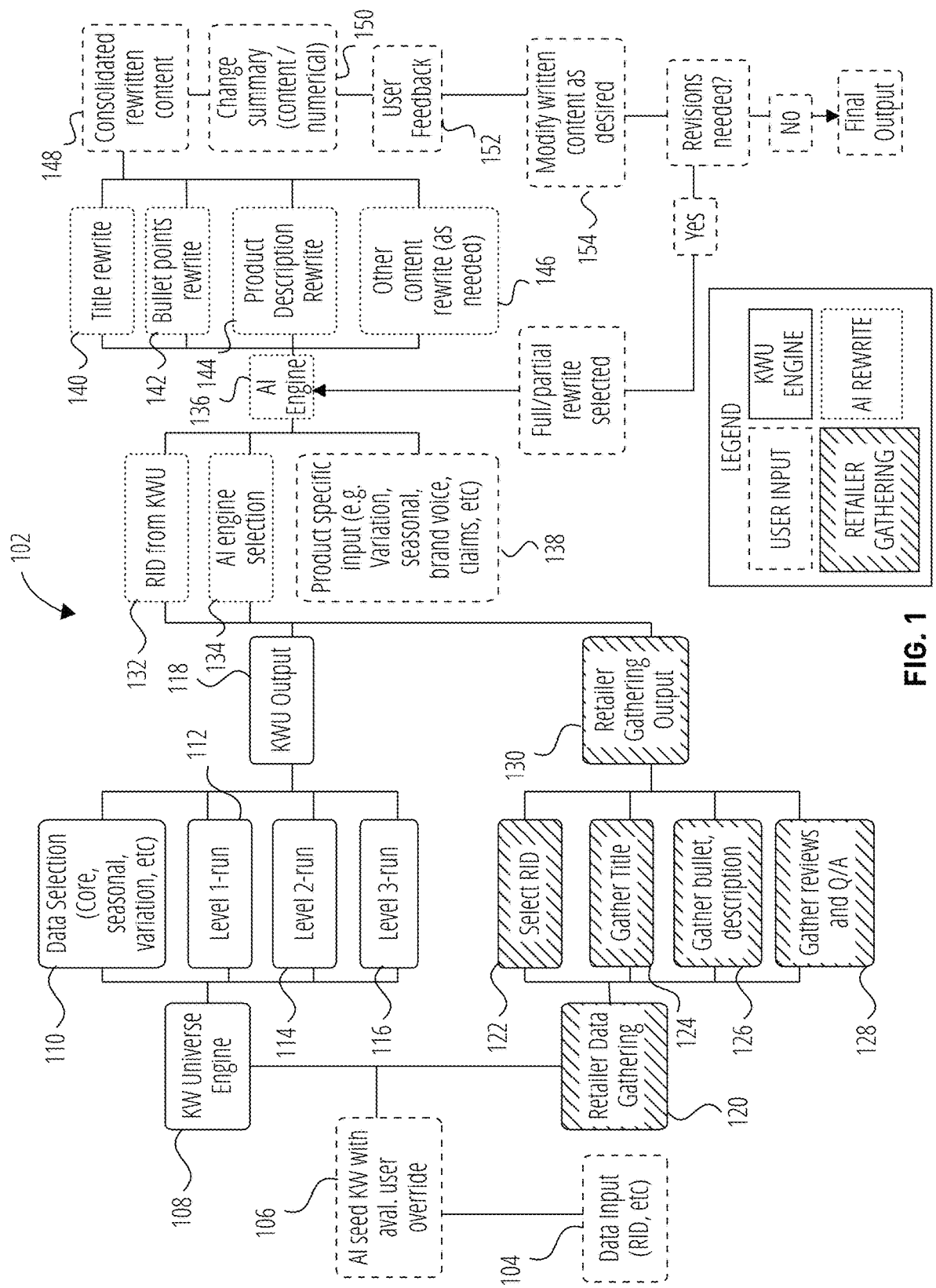
FIG. 1 illustrates a flowchart of a method for a keyword universe system to generate an updated a written description for a webpage in accordance with some embodiments.

FIG. 1 illustrates a flowchart of a method 102 for a keyword universe system to generate an updated a written description for a webpage in accordance with some embodiments. As shown, the method 102 may include steps where user input is received, steps for a keyword universe engine, steps for retailer data gathering, and steps for an AI engine to rewrite a description.

The method may include receiving an initial data input 104 for an item. The initial data input 104 may include a user selection of a SKU. The user may input additional information, and/or the system may generate additional information based on the SKU. For example, the initial data input 104 may include obtaining a retailer identification number (RID), inputting a seed keyword (Seed KW), and a user clicking a "run" button (run).

For instance, as part of the initial data input 104, a SKU may be selected to be analyzed. In some embodiments, the selection may be done either by manually selecting a SKU or using the system to automatically select a SKU based on the selection criteria.

The system may obtain a RID for the SKU. Obtaining the RID can be done either by manually entering the RID or using the system to automatically obtain the RID based on the SKU selection criteria. A RID is a unique identifier assigned to a retailer or business that is involved in the distribution and sale of products. This number may be used to identify the retailer.

In some embodiments, the system selects a seed keyword 106. In some embodiments, the seed keyword 106 can be input automatically by the system. For example, an AI engine may select the seed keyword 106 with user validation and optional override. In other words, the system may present an automatically generated seed keyword 106 that is based on the SKU to a user. The user may approve the seed keyword 106 or may override the automatically generated seed keyword with a user selected keyword. This inputs the seed keyword 106 which may be used to generate a keyword universe. The seed keyword 106 can be any word or phrase that is relevant to the SKU.

In some embodiments, after the initial data input 104 and the seed keyword 106 is received, the system may present the user with a run button. The user may select the run button, and in response the system may start the keyword universe engine 108.

When the keyword universe engine 108 runs, it may identify and select a set of relevant information 110. For example, the keyword universe engine 108 may select the current date. The keyword universe engine 108 may also select the most current keyword metrics. The current keyword metrics may include data related to a keyword such as search volume, click through rate, top products for the keyword, etc. For instance, the keyword universe engine 108 may select the keyword metrics for the current month. Periods of time, in addition to a month, may be used for the keyword metrics. For example, some keywords may be associated with a season. The selection of which time period to use for keyword metrics may be automatic or may be based on user input. The keyword lists may be specific to the retailer using the system. A keyword list may include a group of keywords that are related to a retailer, product, and/or season.

The keyword universe engine 108 may perform a level 1-run 112 to identify keywords for the item. The keyword universe engine 108 may use the RID to look up SKU for a brand. The keyword universe engine 108 may use AI to select a precise seed keyword for this SKU. The keyword universe engine 108 may use the RID to identify a keyword where the RID is found within the top three click share items. These first set of items constitute a level 1 keyword universe.

The keyword universe engine 108 may gather additional keywords by performing a level 2-run 114. The keyword universe engine 108 may select RID for other items that are from a different brand with similar keywords from the level 1 keyword universe. The RID for these secondary items may be selected and re-run through the current keyword lists. Keywords found for secondary items are selected and constitute Level 2 keyword universe.

This process may be iteratively repeated to obtain more keywords. For example, the illustrated embodiment shows a level 3-run 116. Additional level runs may be added as desired. The level 3-run 116 may repeat the steps of the level 2-run. For example, the keyword universe engine 108 may select RID for other items that are from a different brand that the original item and the items in the level 2-run 114 with similar keywords from the level 2 keyword universe. The RID for these additional items may be selected and re-run through the current keyword lists. Keywords found for additional items are selected and constitute Level 3 keyword universe.

In some embodiments, the level of seasonality may be selected by user. For example, the steps described above may be repeated using quarterly keyword metrics for up to prior 2 years, depending on seasonality selected. In some embodiments, the seasonality may be determined on a monthly or weekly basis.

The keyword universe engine 108 may generate an output a keyword universe (e.g., keyword universe output 118). The keyword universe output 118 may include a list of keywords that are relevant to the SKU and that have a high search volume. The keyword universe output 118 may be exported to a file or displayed in a list. In some embodiments, the keyword universe output 118 may include core keywords that are applicable year round and seasonal variation keywords that may be applicable during certain time periods.

A retailer data gathering engine 120 may collect information from the retailer associated with a RID. For example, the retailer data gathering engine 120 may select a RID 122 associated with the key word universe. For instance, if Retailer A listed Item A and the key word universe was associated with Item A, the retailer data gathering engine 120 may determine the RID for Retailer A. The retailer data gathering engine 120 may convert the RID to retailer URL (e.g., the webpage associated with Item A). The retailer data gathering engine 120 may gather existing content for RID from the retailer URL. The existing content may include a title 124, bullet points 126, a product description, enhanced content, product reviews, and product questions and answers 128.

The retailer data gathering engine 120 may provide a retailer gathering output 130. The retailer gathering output 130 may summarize data that the retailer data gathering engine 120 collected including character count, refresh date, and word count. This flow chart outlines the basic steps for gathering retailer data. The specific steps that are used may vary depending on the retailer and the data that is being gathered.

The keyword universe output 118 and the retailer gathering output 130 may be sent to a rewrite engine. The rewrite engine may alter the composition a wording for titles, bullets, descriptions, and hidden data (e.g., meta-data) from the retailer gathering output 130 based on the keyword universe output 118.

For example, the rewrite engine may select the RID 132 associated with the keyword universe. Further, the rewrite engine may select keywords (e.g., from level 1 and 2 keywords) from the keyword universe. In some embodiments, the rewrite engine may select the keywords using the AI engine 136. The rewrite engine may provide an optional user override for the selected keywords. For example, the AI engine 136 may select key words for the specific portions of the webpage (e.g., title, detailed description, bullets, meta-data). A graphical user interface may display the keywords and portions selected by the AI, and the user may alter which keywords and/or which portion the keywords should be used in.

The rewrite engine may operate using various available AI engines (e.g., AI engine 136). In some embodiments, the system or a user may select 134 an AI Engine to use based on subscriptions and findings of a valid output with desirable written content creation. For example, the system may obtain all the subscriptions a user has and, based on feedback of the current user and/or other users (e.g., how much modification is performed by users after the rewrite engine outputs content), may select the AI engine 136.

The system may also present, on a graphical user interface, interactive elements that may allow a user to provide the rewrite engine with product specific inputs 138. The product specific inputs 138 may include desired variation parameters, seasonal instructions, brand voice guidelines, etc. The product specific inputs 138, the retailer gathering output 130, and the selected keywords from the keyword universe output 118 may be sent to the AI engine 136 for a rewrite.

For example, the rewrite engine may pass a TITLE prompt that the system generates based on the product specific inputs 138, the retailer gathering output 130, and the selected keywords from the keyword universe output 118 may be sent to the AI engine 136. In some embodiments, the AI may generate the TITLE prompt automatically based on the user inputs. The TITLE prompt may ask the AI engine 136 to rewrite the title from the retailer gathering output 130 to include exact keyword matches, retailer guidelines, brand guidelines, season instructions, and other elements. The Title prompt can be revised based on the format of the webpage, customer desires, etc. For example, the TITLE prompt may include: "Rewrite this [insert retailer name] product title: [insert current product title]. Make it 125-150 characters long. Put the brand name first: [insert current brand name]. Include at least 3 of the following exact keywords: [insert Level 1 and 2 KW from the keyword universe list." Based on the TITLE prompt, the AI engine 136 may output a rewritten title 140.

Similarly, the rewrite engine may pass a BULLET prompt for each of the bullets on the webpage to the AI engine 136. For example, a BULLET ONE prompt may be passed to the AI engine 136 (can be revised as needed) asking it to rewrite to include exact keyword matches, retailer guidelines, brand guidelines, seasons instructions, and other elements. The rewrite engine may pass BULLET prompts for each bullet point. Similarly, a DESCRIPTION prompt may be passed to the AI engine 136 (can be revised as needed) asking it to rewrite to include exact keyword matches, retailer guidelines, brand guidelines, season instructions, and other elements. The process may be repeated as needed for product descriptions, enhanced content, or other fields found on the product detail page as specified by user or system set-up.

The AI engine 136 may output a rewritten title 140, rewritten bullet points 142, rewritten description 144, and other content 146. The rewrite engine may consolidate 148 the rewritten content. The rewrite engine may generate and display a change summary 150 that presents changes to the original title, bullet points, description, etc. The rewrite engine may receive user feedback 152 and modify 154 the written content as desired by the user. If revisions are requested by the user they may be fed back into the AI engine. This feedback may be used to generate new outputs as well as improve future results.

The system may then output rewritten sections of the webpage (e.g., title, bullet points, meta-data, description). The system may output the rewritten section in a format that aligns with upload requirements of the online platform hosting the product webpage. In some embodiments, the user may select a desired output format. In some embodiments, the system may be able to determine the format for the output. For example, the system may determine that the product is listed on a first ecommerce platform and output a file in a format based on the upload requirements of the first ecommerce platform.

Figure 2:
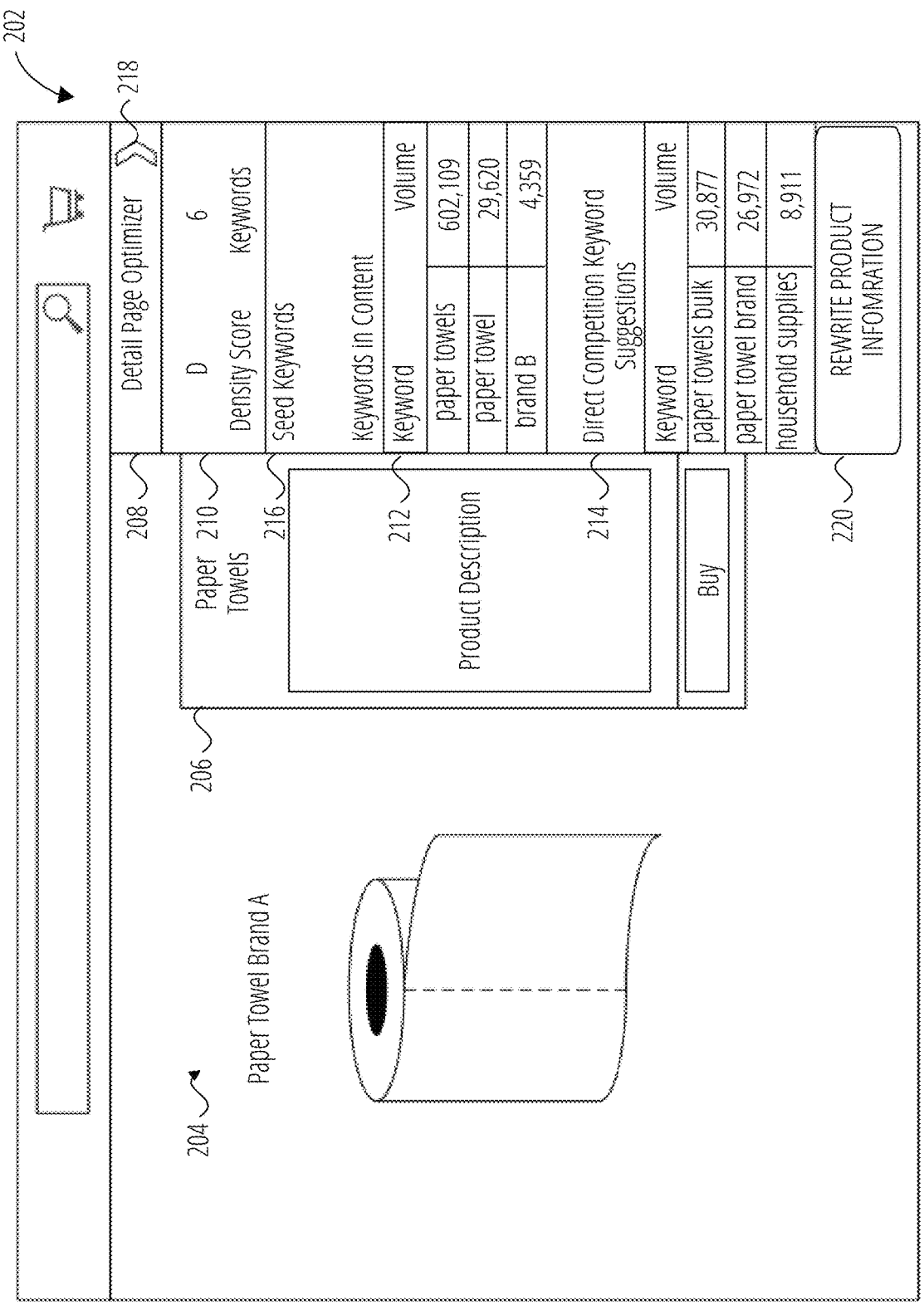
FIG. 2 illustrates an example condensed initial overlay window for a detail page optimizer in accordance with some embodiments.
Figure 3:
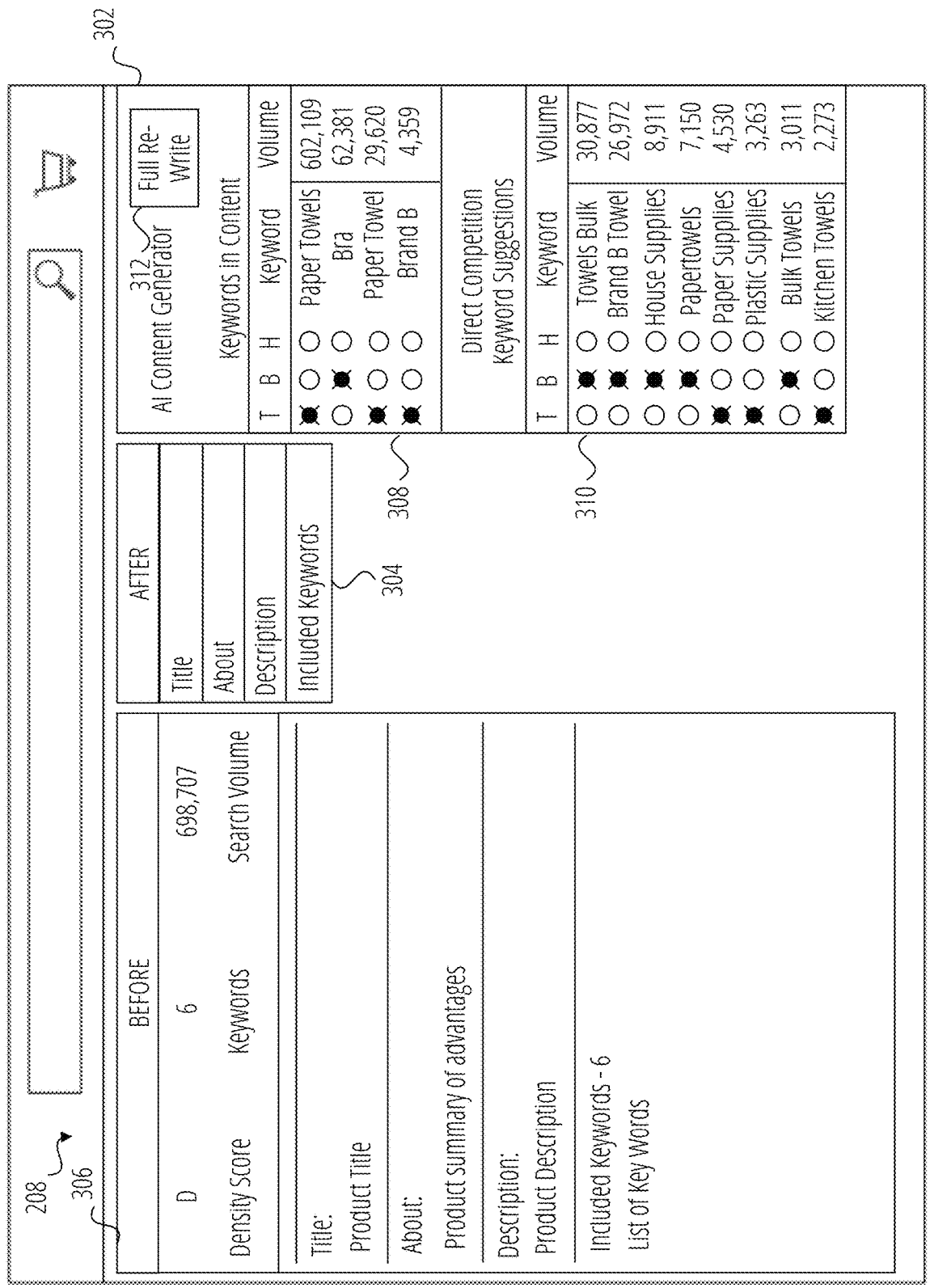
FIG. 3 illustrates the expanded view of the detail page optimizer before a rewrite occurs in accordance with some embodiments.
Figure 4:
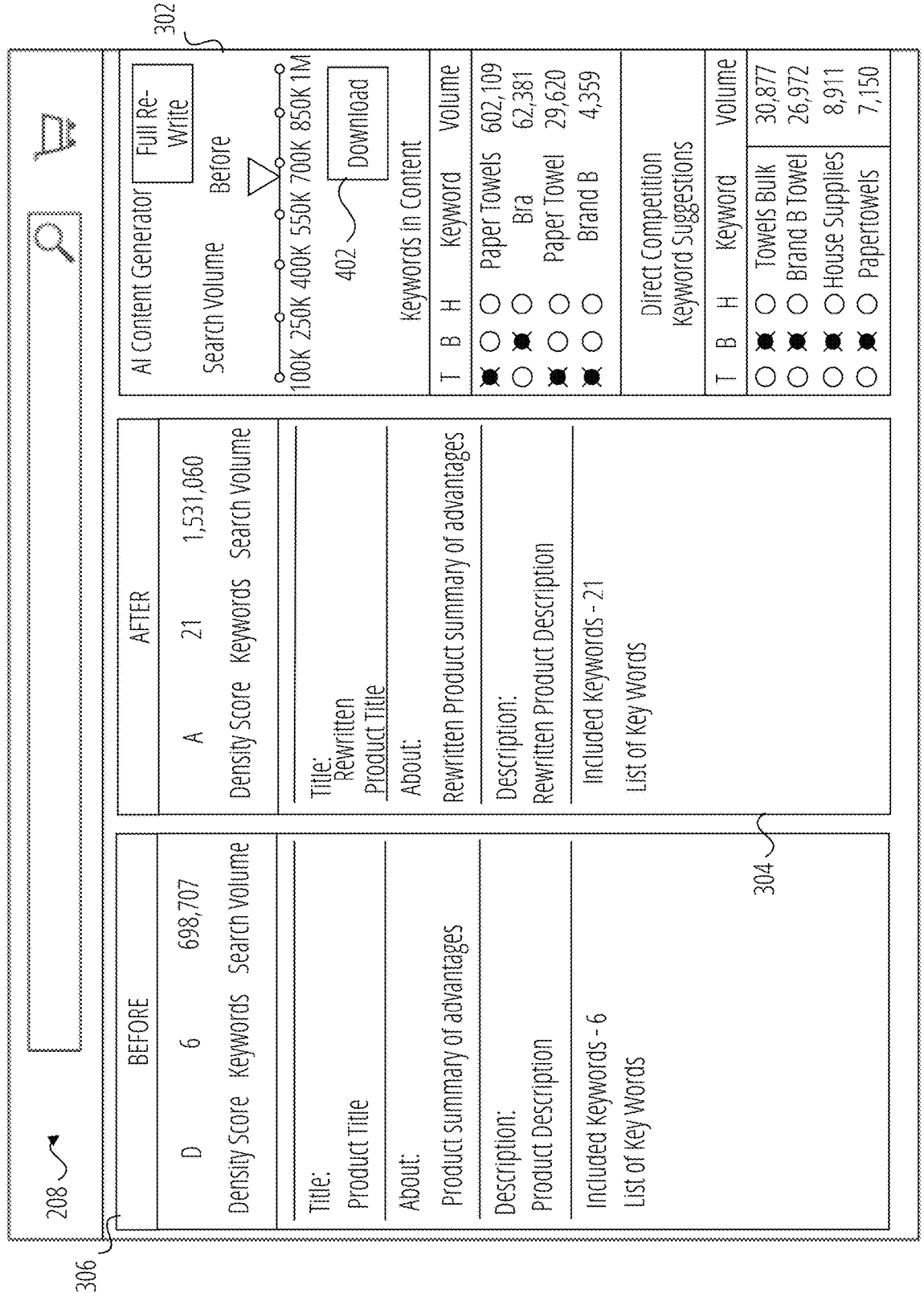
FIG. 4 illustrates the expanded view of the detail page optimizer after a rewrite occurs in accordance with some embodiments.

FIGS. 2-4 illustrate an example graphical user interface 202 in accordance with some embodiments. Specifically, FIG. 2 illustrates an example condensed initial overlay window for a detail page optimizer 208. The detail page optimizer 208 may perform the method 102 of FIG. 1. As shown, the detail page optimizer 208 may include a minimization element 218, which when clicked will minimize the detail page optimizer 208. When minimized, a small selectable element (e.g., an initialize input) may be displayed to restore the detail page optimizer 208 to the initial overlay window.

As shown, the initial overlay window for a detail page optimizer 208 may partially overlay a webpage for a product. A user may navigate to a product webpage, and while on the product webpage may select an element to open the detail page optimizer 208. In some embodiments, the initial overlay window may be sized to on cover a portion of the webpage to allow simultaneous review of both the initial overlay window and the product page 204. In some embodiments, the initial overlay window may automatically resize or reposition to avoid covering the product information 206.

The detail page optimizer 208 then may automatically determine data such as the RID, the SKU, and seed keywords based on the current webpage of the user. For instance in the illustrated embodiment, the user is on a product page 204 for a paper towel. The product page 204 showcases a specific product available for purchase on a marketplace. It may serve as a comprehensive hub of information for potential buyers, providing them with details about the product, user reviews, pricing, shipping options, and other relevant information. For example, the product page may include product information 206 (e.g., title, image, a set of bullet points, and a detailed description).

The detail page optimizer 208 may scrape the contents of the product page 204, and segment the contents into different sections (e.g., title, bullets, product description, meta-data). The detail page optimizer 208 may also generate one or more initial seed keywords 216. The seed keywords 216 may be edited by a user by editing a text field. The seed keywords 216 may be generated using AI. For instance, the title description, bullet points, reviews, questions and answers, and/or meta-data may be sent to an AI engine with a request for one or more seed keywords 216.

The detail page optimizer 208 may generate a keyword universe based on multiple level runs as explained with reference to FIG. 1. Keywords from one or more levels of the keyword universe may be presented. For instance, the detail page optimizer 208 may display keywords 212 that are currently in the content, and suggested keywords 214 to include in the content of the product page 204. Further, the detail page optimizer 208 may display the search volume for the keywords. The keywords may be determined based on a database of historic search terms for products related to/competing with the product on the product page 204. The database may include the search terms, the volume of searches, the click through rate of products, and other information.

Additionally, the detail page optimizer 208 may display a density score 210. The density score 210 may be based on a number of factors. For example, the density score may be based on the number of keywords currently in the content, the volume of searches for the current keywords, the volume of searches for keywords in competitor products, the amount of other words in relation to the keywords, etc.

A user may select a run button 220 to cause the detail page optimizer 208 to automatically rewrite the product information 206 using AI. When the run button 220 is selected, the detail page optimizer 208 may enter an expanded view as shown in FIGS. 3 and 4. Specifically, FIG. 3 illustrates the expanded view of the detail page optimizer 208 before a rewrite occurs, and FIG. 4 illustrates the expanded view of the detail page optimizer 208 after a rewrite occurs.

As shown in FIG. 3, the detail page optimizer 208 may expand into three panels (e.g., first panel 302, second panel 304, and third panel 306). The panels may expand to the size of the window of the product page.

In the first panel 302, the page optimizer 208 may display the keywords 308 currently in the content, and the keywords 310 that are suggested from competitions content. Further, the first panel 302 may indicate which portion (e.g., title, body, hidden) of the content that the keywords are to be inserted into. The portion indicated for each keyword may be suggested by the AI and edited by the user. For example, the user may select a series of radio buttons next to the keywords to indicate the section where the keywords should be placed. In some embodiments, the radio buttons may be pre-populated based on the current location of keywords and AI suggestions.

The second panel 304 may be a panel that shows results after a re-write occurs. Because FIG. 3 shows the detail page optimizer 208 prior to a rewrite, the second panel 304 is blank. The third panel 306 may display the current state of the product information. For instance, the third panel 306 may show the current title, and description separated into multiple sections. The third panel 306 may also show the currently included keywords, the density score and the search volume. In some embodiments, the detail page optimizer 208 may highlight keywords in the product information in third panel 306.

The detail page optimizer 208 may include a button 312 to initiate the rewrite of the content. When the button 312 is selected, the detail page optimizer 208 may send prompts to an AI engine to cause it to rewrite the title, description, hidden information, and other product related information on the webpage.

FIG. 4 illustrates the expanded view of the detail page optimizer 208 after a rewrite occurs. As shown, the second panel 304 now include the rewritten material. For example, it may include a rewritten product title, a rewritten product summary, and a rewritten product description. In some embodiments, the detail page optimizer 208 may highlight keywords in the rewritten material. The second panel 304 may also include a new density score. Further, the detail page optimizer 208 may also include a comparison between the before and after search volumes. The after search volumes may be a prediction based on the search volumes of the newly incorporated keywords. For example, the system may add the volume of searches from the newly incorporated keywords to the before search volume to predict the after search volume.

By overlaying the detail page optimizer 208 there is no need for a user to switch between different windows. In some embodiments, the detail page optimizer 208 may not display the third panel 306. Instead, the detail page optimizer 208 may identify a location of the current description and title on the webpage and position the second panel 304 that includes the rewritten material next to the current description and title. In some embodiments, the detail page optimizer 208 may prevent the user interface from covering up the current description and title.

Further, the positioning of the panels may facilitate easy comparison between the before and after descriptions. A download button 402 may be selected by a user to download the rewritten content. In some embodiments, the downloaded content may be formatted in according to the standards of the platform hosting the product webpage. In some embodiments, the detail page optimizer 208 may determine the platform based on the webpage, then formatting the output based on the standards of the platform.

For example, FIG. 5 illustrates an example output 502 of the detail page optimizer. As shown, in some embodiments, the output 502 may be formatted in a spreadsheet with each column representing a different part of the product information. The output format may be altered based on the upload standards of a host site. In some embodiments, a user may manually select a desired format or the system may automatically determine the format based on the current webpage.

Figure 6:
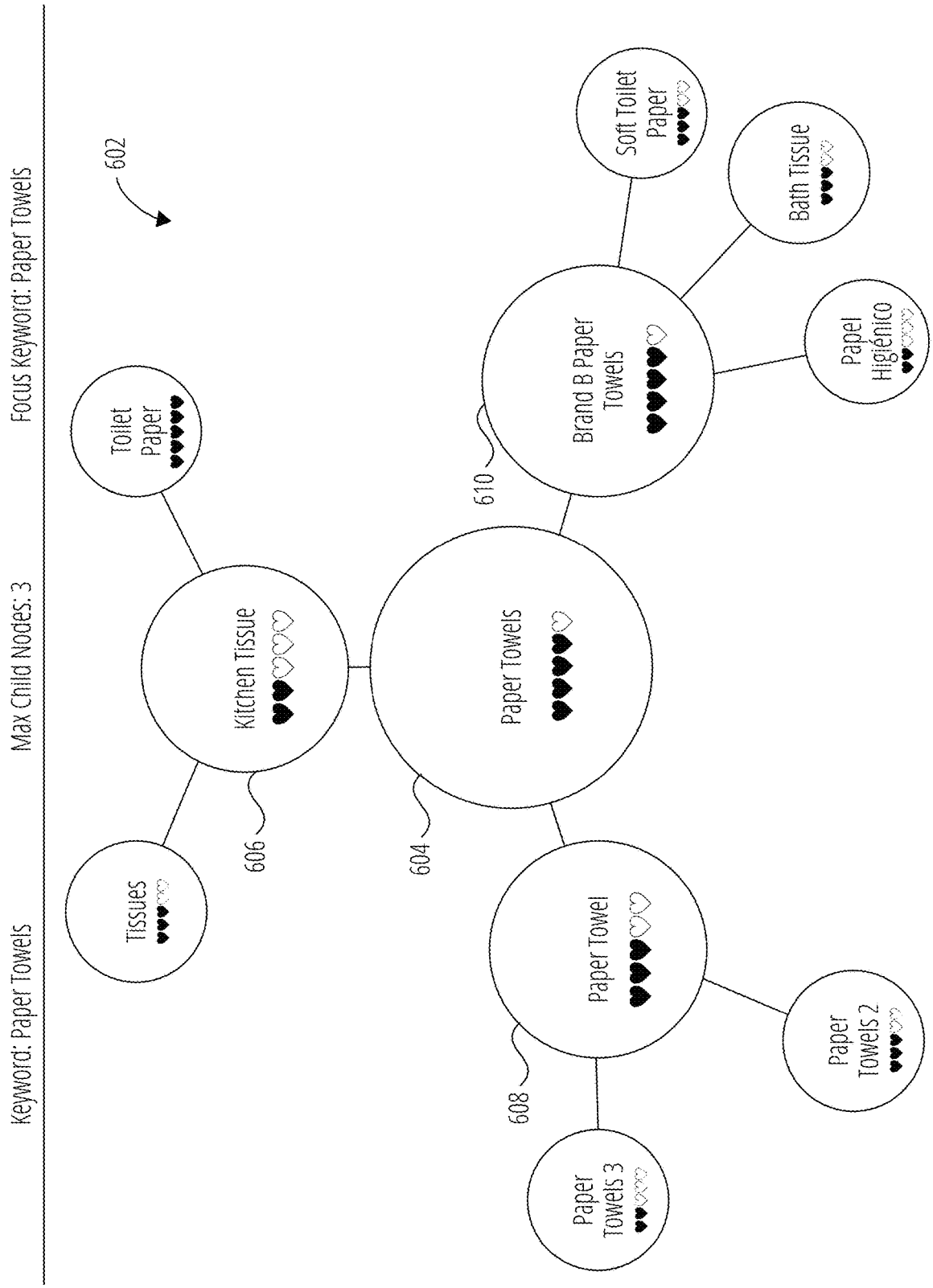
FIG. 6 illustrates a keyword universe tree in accordance with some embodiments.

FIG. 6 illustrates a keyword universe tree 602 in accordance with some embodiments. The keyword universe tree 602 provides a visualization of the keywords from the keyword universe described with reference to FIG. 1. In some embodiments, the graphical user interface may provide an option to show the keyword universe tree 602. The keyword universe tree 602 may be used to show where certain keywords are from.

In some embodiments, a user may be able to provide inputs to the keyword universe tree 602 to remove certain keywords. For example, if a keyword is irrelevant to the item, a user may select a hub or a branch and remove that set of keywords. In some embodiments, the user may be able to select a keyword hub (e.g., a last level keyword hub) to cause the keyword universe engine to generate another level of keywords based on that keyword hub.

As shown, a seed keyword 604 may serve as the central hub of the keyword universe tree 602. This seed keyword 604 may be selected by AI. For example, an SKU and RID associated with an item of a webpage that a user is on may be automatically fed into an AI engine. The AI engine may select a seed keyword 604 which may be any word or phrase that is relevant to the SKU. The system may present this seed keyword 604 to the user and the user may approve or override the keyword.

The keyword universe engine may then access a database of historic search volumes for the seed keyword 604. The historic database may include information regarding how much the users search the seed keyword 604, what were the associated products that were clicked on when the seed keyword 604 was searched, and what associated products did users actually purchase. Based on the historic search volumes, the keyword universe engine may determine one or more items that were the most successful search results (e.g., most clicks for that search term) to determine a level 1 set of keywords (e.g., keyword 606, keyword 608, and keyword 610). The keyword universe engine may determine additional keywords people searched for to get to those associated products to determine the level 1 set of keywords. The process may be repeated to determine additional levels of keywords based on the level 1 set of keywords to determine a level 2 set of keywords, and then the level 2 set of keywords may be used to determine a level 3 set of keywords.

Figure 7:
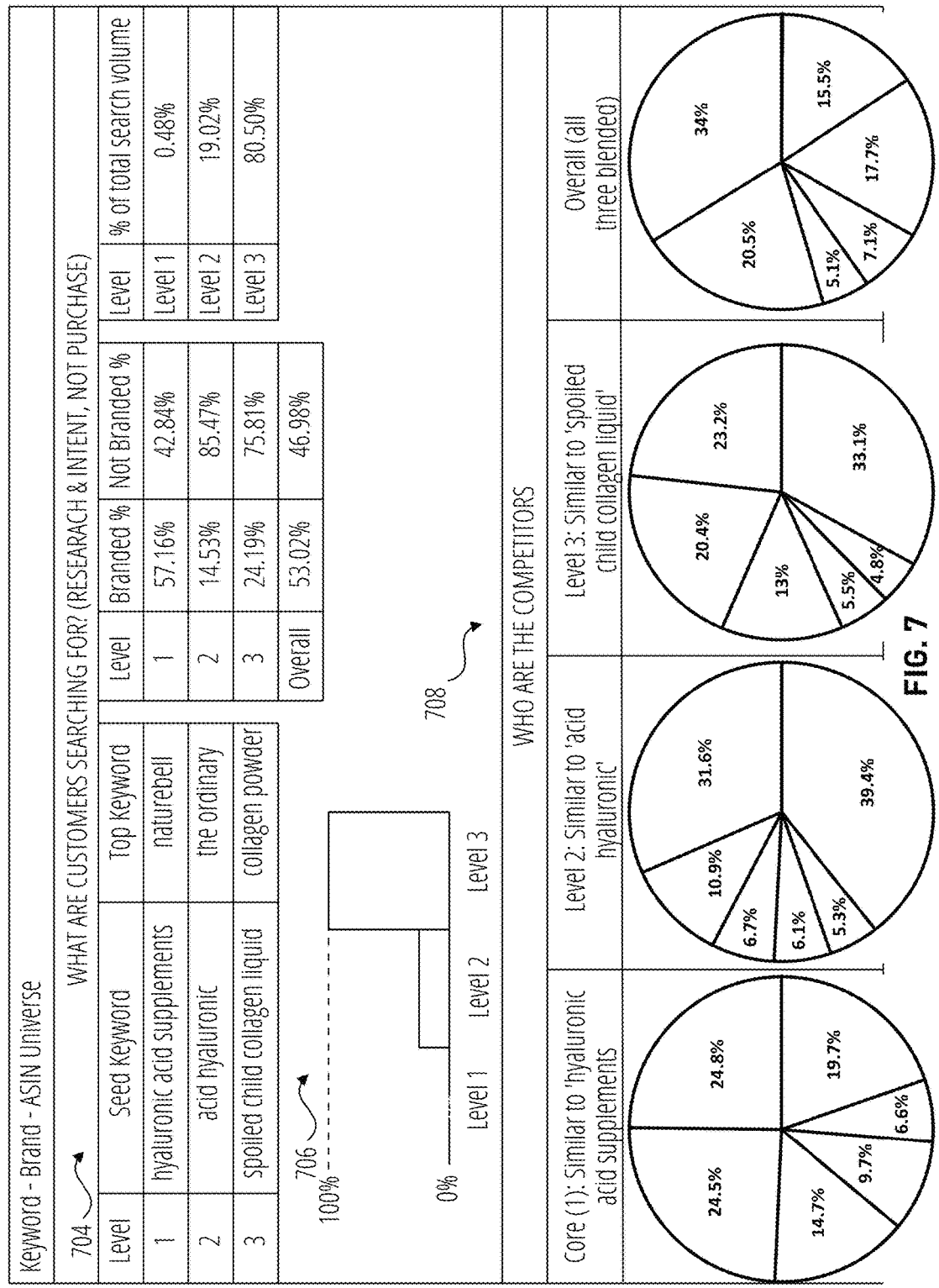
FIG. 7 illustrates a dashboard for the detail page optimizer system in accordance with some embodiments.

FIG. 7 illustrates a dashboard 702 for the detail page optimizer system in accordance with some embodiments. The dashboard 702 may provide information related to the keywords 704. For example, the illustrated embodiment of the dashboard 702 shows percentage of total search volumes 706 for each of the level keywords. In the illustrated embodiments, the level 3 keywords command the majority of the search volume with 80.5%. Accordingly, by incorporating the level 2 and level 3 keywords, the user may improve the number of searches where an item would appear. Additionally, the dashboard 702 may show a series of pie charts 708 demonstrating the breakdown of search volumes per brand for the different keywords 704 and an overall division of the search terms per brand for all of the keywords 704.

Figure 8:
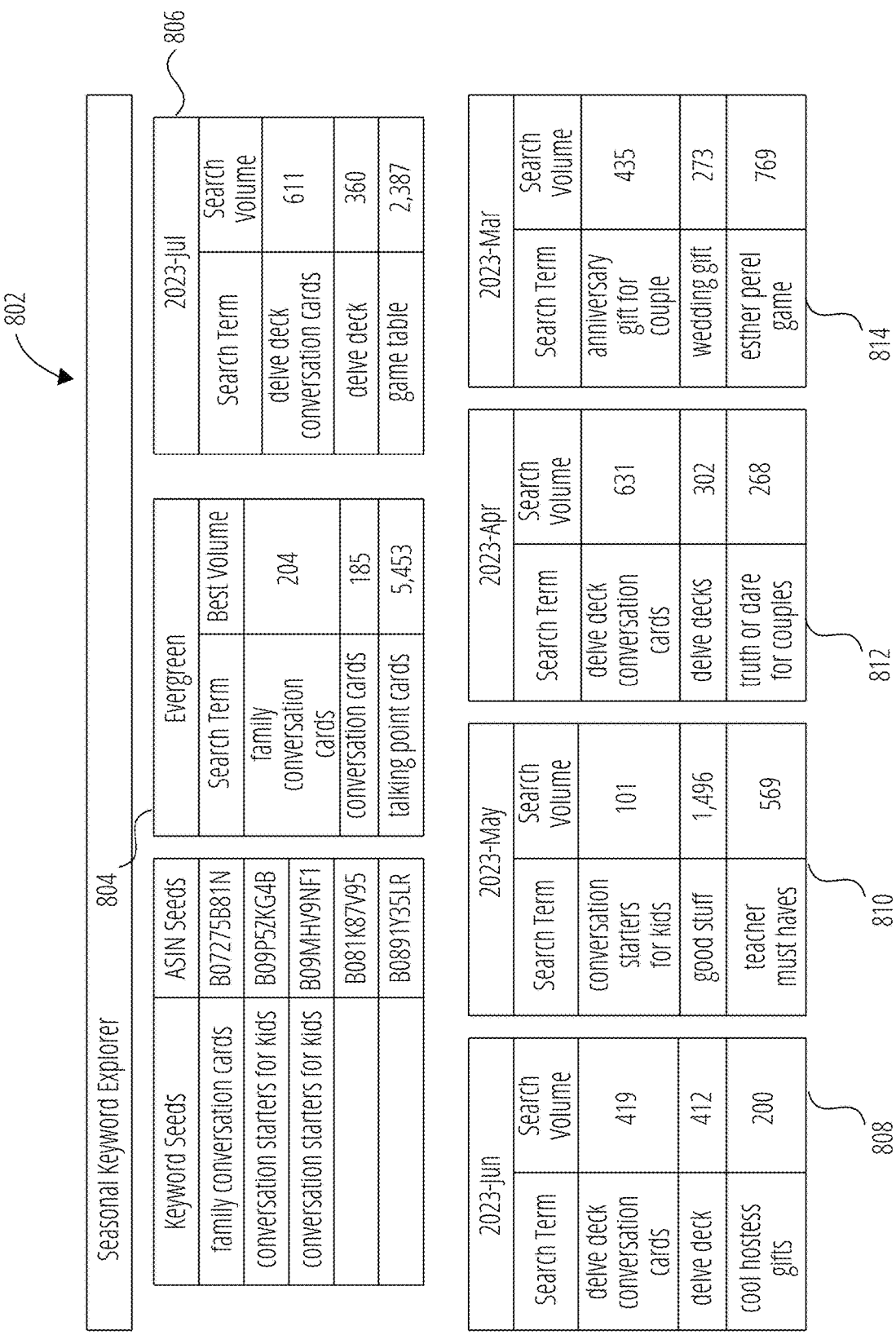
FIG. 8 illustrates a partial seasonal keyword explorer interface for the detail page optimizer system in accordance with some embodiments.

FIG. 8 illustrates a partial seasonal keyword explorer interface 802 for the detail page optimizer system in accordance with some embodiments. The seasonal keyword explorer interface 802 may display a list of evergreen keywords 804 as well as keyword lists specific to a set of seasons (e.g., July keywords 806, June keywords 808, May keywords 810, April keywords 812, March keywords 814). The evergreen keywords 804 may include keywords that remain at a high search volume regardless of season.

The seasonal keyword lists may be keywords with search volumes that increase during specific periods of time. In some embodiments, the seasonal keyword lists may be associated with a month. In some embodiments, the seasonal period may be adjusted to a quarter of a year or other periods of time. The detail page optimizer system may generate these keywords and use the seasonal keywords and the evergreen keywords 804 to generate rewritten product information based on a current period of the year.

In some embodiments, the detail page optimizer system may automatically update the seasonal keyword lists before the period of time is reached. In some embodiments, the detail page optimizer system may provide a notification to a user when a seasonal change should be used to rewrite the product information. For instance, the detail page optimizer system may compare the seasonal keyword list and based on the differences in terms and search volume, the detail page optimizer system may provide a notification to update the product information. The notification may be provided in a number of ways. For example, in some embodiments, the notification may be an email, a pop-up, or a text. In some embodiments, the detail page optimizer system may automatically generate rewritten product information when a seasonal change occurs and provide the rewritten product information to the user.

Figure 9:
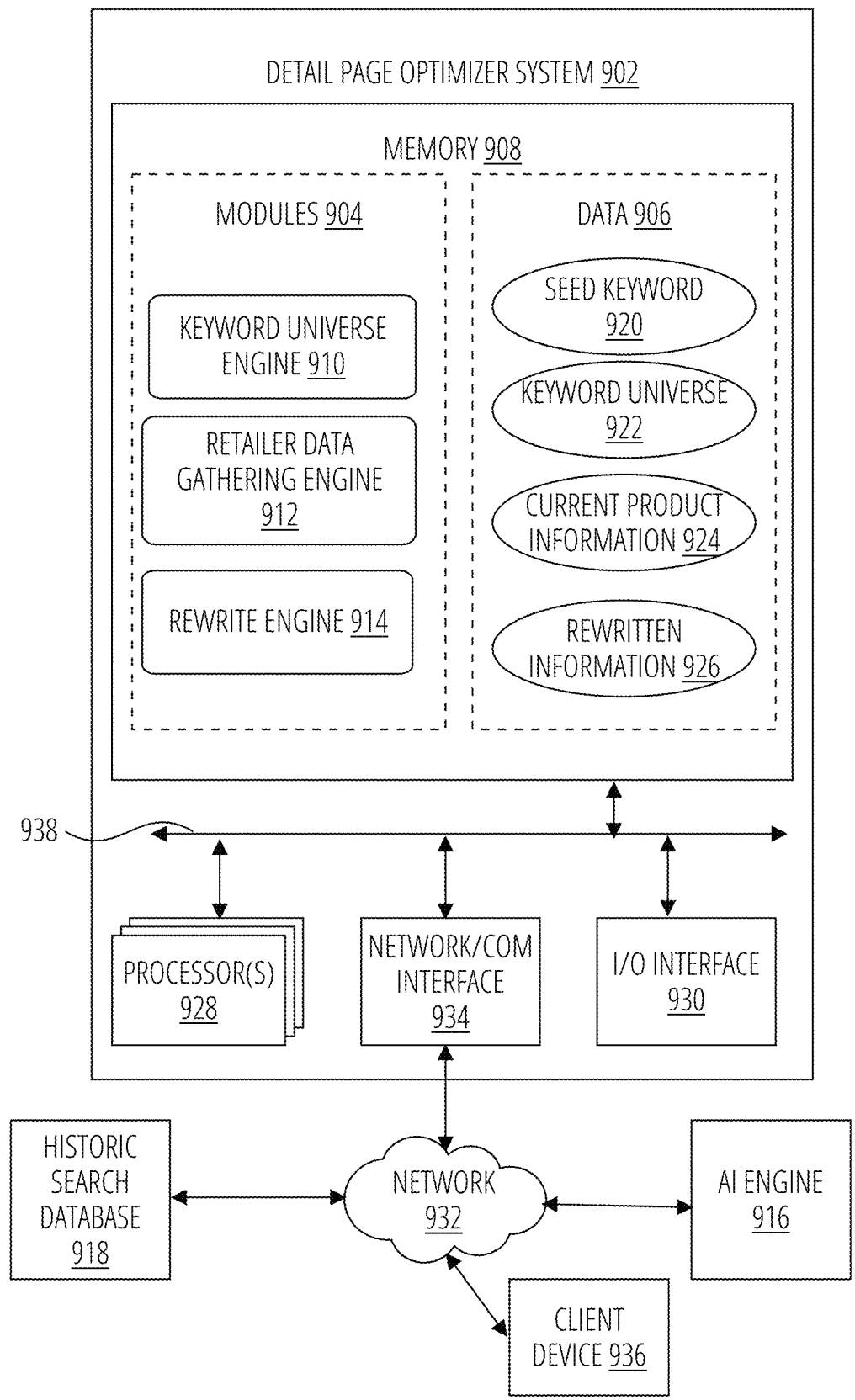
FIG. 9 illustrates a block diagram of a detail page optimizer system in accordance with some embodiments.

FIG. 9 is a block diagram of a detail page optimizer system 902 in accordance with some embodiments. The detail page optimizer system 902 may perform method 102 of FIG. 1 and method 1000 of FIG. 10. The detail page optimizer system 902 can include a memory 908, one or more processors 928, a network interface 934, an input/output interface 930, and a system bus 809.

The one or more processors 928 may include one or more general purpose devices, such as an Intel®, AMD®, or other standard microprocessor. The one or more processors 804 may include a special purpose processing device, such as ASIC, SoC, SiP, FPGA, PAL, PLA, FPLA, PLD, or other customized or programmable device. The one or more processors 804 can perform distributed (e.g., parallel) processing to execute or otherwise implement functionalities of the presently disclosed embodiments. The one or more processors 928 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 908 may include static RAM, dynamic RAM, flash memory, one or more flip-flops, ROM, CD-ROM, DVD, disk, tape, or magnetic, optical, or other computer storage medium. The memory 908 may include a plurality of program modules 904 and program data 906. The memory 908 may be local to the detail page optimizer system 902, as shown, or may be distributed and/or remote relative to the detail page optimizer system 902.

The program modules 904 may include all or portions of other elements of the detail page optimizer system 902. The program modules 904 may run multiple operations concurrently or in parallel by or on the one or more processors 928. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems and/or the like.

The modules 904 may comprise a keyword universe engine 910, a retailer data gathering engine 912, and a rewrite engine 914. The keyword universe engine 910 may generate the keyword universe 922 using the seed keyword 920. The retailer data gathering engine 912 may collect the current product information 924. The rewrite engine 914 may generate the rewritten information 926.

The memory 908 may also include the data 906. Data generated by the detail page optimizer system 902 may be stored on the memory 803. The data 906 may include a seed keyword 920, a keyword universe 922, a current product information 924, and rewritten information 926.

The input/output interface 930 may facilitate user interaction with one or more input devices and/or one or more output devices. The input device(s) may include a keyboard, mouse, touchscreen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interface 934 may facilitate communication with other computing devices and/or networks and/or other computing and/or communications networks. For example, the network interface 934 may communicate with an AI engine 916, a client device 936, and a historic search database 918. The detail page optimizer system 902 may provide the client device 936 with a graphical user interface to receive inputs and display outputs.

The network interface 934 may be equipped with conventional network connectivity, such as, for example, Ethernet (IEEE 1102.3), Token Ring (IEEE 1102.5), Fiber Distributed Datalink Interface (FDDI), or Asynchronous Transfer Mode (ATM). Further, the network interface 934 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 938 may facilitate communication and/or interaction between the other components of the detail page optimizer system 902, including the one or more processors 928, the memory 908, the input/output interface 930, and the network interface 934.

Figure 10:
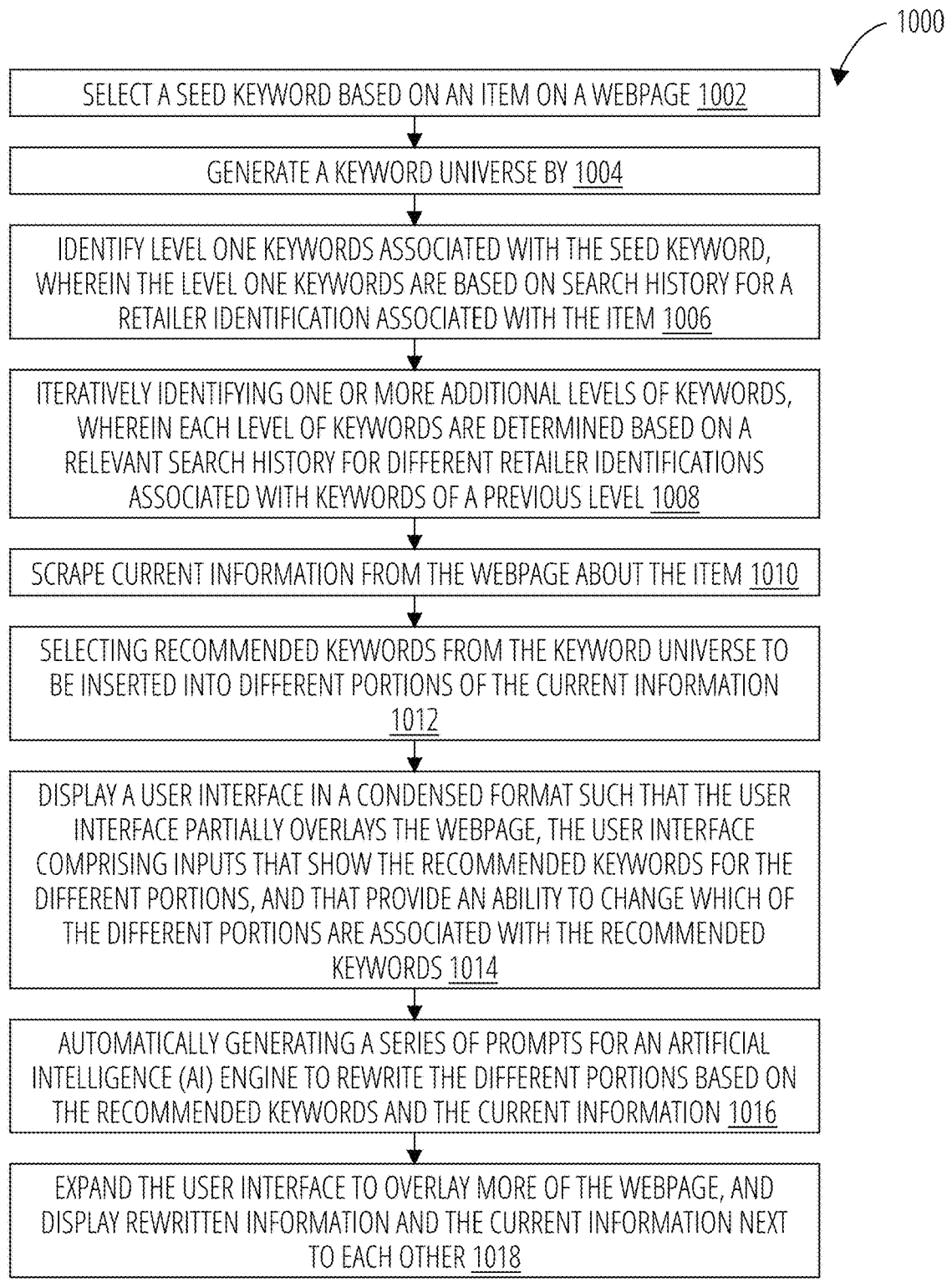
FIG. 10 illustrates a method for updating content on a webpage in accordance with one embodiment.

FIG. 10 illustrates a method 1000 for updating content on a webpage in accordance with some embodiments. The illustrated method 1000 includes selecting 1002 a seed keyword based on an item on a webpage. The method 1000 further includes generating 1004 a keyword universe by. The method 1000 further includes identifying 1006 level one keywords associated with the seed keyword, wherein the level one keywords are based on search history for a retailer identification associated with the item. The method 1000 further includes iteratively identifying 1008 one or more additional levels of keywords, wherein each level of keywords are determined based on a relevant search history for different retailer identifications associated with keywords of a previous level. The method 1000 further includes scraping 1010 current information from the webpage about the item. The method 1000 further includes selecting 1012 recommended keywords from the keyword universe to be inserted into different portions of the current information.

The method 1000 further includes displaying 1014 a user interface in a condensed format such that the user interface partially overlays the webpage. The user interface may comprise inputs that show the recommended keywords for the different portions, and that provide an ability to change which of the different portions are associated with the recommended keywords. The method 1000 further includes automatically generating 1016 a series of prompts for an AI engine to rewrite the different portions based on the recommended keywords and the current information. The method 1000 further includes expanding 1018 the user interface to overlay more of the webpage, and display rewritten information and the current information next to each other.

In some embodiments, the seed keyword is initially selected by the AI engine, and wherein the user interface provides an option for user input to override the seed keyword.

In some embodiments, automatically generating the series of prompts comprises providing product specific input including a desired voice.

In some embodiments, the method 1000 further comprises receiving user feedback on the rewritten information and sending the feedback back to the AI engine.

In some embodiments, the keyword universe includes seasonal keywords.

In some embodiments, the method 1000 further comprises automatically updating or prompting a user to update the rewritten information based on a date change based on the seasonal keywords.

In some embodiments, the method 1000 further comprises displaying an initialize input, and identifying the item and the webpage by determining a current webpage focus of a browser when the initialize input is selected by a user.

In some embodiments, the method 1000 further comprises positioning the user interface when in the condensed format such that the current information is not obstructed.

Embodiments contemplated herein include an apparatus comprising means to perform one or more elements of the method 1000 and method 102. This apparatus may be, for example, the detail page optimizer system 902.

Embodiments contemplated herein include one or more non-transitory computer-readable media comprising instructions to cause an electronic device, upon execution of the instructions by one or more processors of the electronic device, to perform one or more elements of the method 1000 and method 102. This non-transitory computer-readable media may be, for example, a memory of the detail page optimizer system 902.

Embodiments contemplated herein include an apparatus comprising logic, modules, or circuitry to perform one or more elements of the method 1000 and method 102.

Embodiments contemplated herein include an apparatus comprising: one or more processors and one or more computer-readable media comprising instructions that, when executed by the one or more processors, cause the one or more processors to perform one or more elements of the method 1000 and method 102.

Embodiments contemplated herein include a computer program or computer program product comprising instructions, wherein execution of the program by a processing element is to cause the processing element to carry out one or more elements of the method 1000 and method 102.

For one or more embodiments, at least one of the components set forth in one or more of the preceding figures may be configured to perform one or more operations, techniques, processes, and/or methods as set forth herein. For example, a processor as described herein in connection with one or more of the preceding figures may be configured to operate in accordance with one or more of the examples set forth herein. For another example, circuitry in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method for updating content on a webpage, the method comprising:
   selecting a seed keyword based on an item on a webpage;
   generating a keyword universe by:
      obtaining a retailer identification number associated with the item on the webpage;
      identifying level one keywords associated with the seed keyword, wherein the level one keywords are based on search history for the retailer identification number associated with the item;
      iteratively identifying one or more additional levels of keywords, wherein each of the additional levels of keywords are identified by:
         obtaining one or more new retailer identification numbers associated with one or more new items that are top clicked search results for keywords in a previous level; and
         identifying new keywords for a current level based on a relevant search history for the one or more new retailer identification numbers;
   scraping current information from the webpage about the item;
   selecting recommended keywords from the keyword universe to be inserted into different portions of the current information;
   displaying a user interface in a condensed format such that the user interface partially overlays the webpage, the user interface comprising inputs that show the recommended keywords for the different portions, and that provide an ability to change which of the different portions are associated with the recommended keywords;
   automatically generating a series of prompts for an artificial intelligence (AI) engine to rewrite the different portions based on the recommended keywords, the current information, and the inputs of the user interface; and
   expanding the user interface to overlay more of the webpage, and display rewritten information and the current information next to each other.

2. The method of claim 1, wherein the seed keyword is initially selected by the AI engine, and wherein the user interface provides an option for user input to override the seed keyword.

3. The method of claim 1, wherein automatically generating the series of prompts comprises providing product specific input including a desired voice.

4. The method of claim 1, further comprising receiving user feedback on the rewritten information and sending the feedback back to the AI engine.

5. The method of claim 1, wherein the keyword universe includes seasonal keywords.

6. The method of claim 5, further comprising automatically updating or prompting a user to update the rewritten information based on a date change based on the seasonal keywords.

7. The method of claim 1, further comprising displaying an initialize input, and identifying the item and the webpage by determining a current webpage focus of a browser when the initialize input is selected by a user.

8. The method of claim 1, further comprising positioning the user interface when in the condensed format such that the current information is not obstructed.

9. A computing apparatus comprising:
   a processor; and
   a memory storing instructions that, when executed by the processor, configure the apparatus to:
      select a seed keyword based on an item on a webpage;
      generate a keyword universe by:
         obtaining a retailer identification number associated with the item on the webpage;
         identifying level one keywords associated with the seed keyword, wherein the level one keywords are based on search history for the retailer identification number associated with the item; and iteratively identifying one or more additional levels of keywords, wherein each of the additional levels of keywords are identified by:
  obtaining one or more new retailer identification numbers associated with one or more new items that are top clicked search results for keywords in a previous level; and
  identifying new keywords for a current level based on a relevant search history for the one or more new retailer identification numbers;
scrape current information from the webpage about the item;
select recommended keywords from the keyword universe to be inserted into different portions of the current information;
display a user interface in a condensed format such that the user interface partially overlays the webpage, the user interface comprising inputs that show the recommended keywords for the different portions, and that provide an ability to change which of the different portions are associated with the recommended keywords;
automatically generate a series of prompts for an artificial intelligence (AI) engine to rewrite the different portions based on the recommended keywords, the current information, and the inputs of the user interface; and
expand the user interface to overlay more of the webpage, and display rewritten information and the current information next to each other.

10. The computing apparatus of claim 9, wherein the seed keyword is initially selected by the AI engine, and wherein the user interface provides an option for user input to override the seed keyword.

11. The computing apparatus of claim 9, wherein automatically generating the series of prompts comprises providing product specific input including a desired voice.

12. The computing apparatus of claim 9, wherein the instructions further configure the apparatus to receive user feedback on the rewritten information and send the feedback back to the AI engine.

13. The computing apparatus of claim 9, wherein the keyword universe includes seasonal keywords.

14. The computing apparatus of claim 13, wherein the instructions further configure the apparatus to automatically update or prompt a user to update the rewritten information based on a date change based on the seasonal keywords.

15. The computing apparatus of claim 9, wherein the instructions further configure the apparatus to display an initialize input, and identify the item and the webpage by determining a current webpage focus of a browser when the initialize input is selected by a user.

16. The computing apparatus of claim 9, wherein the instructions further configure the apparatus to position the user interface when in the condensed format such that the current information is not obstructed.

17. A non-transitory computer-readable storage medium, the computer-readable storage medium including instructions that when executed by a computer, cause the computer to:
select a seed keyword based on an item on a webpage;
generate a keyword universe by:
  obtaining a retailer identification number associated with the item on the webpage;
  identifying level one keywords associated with the seed keyword, wherein the level one keywords are based on search history for the retailer identification number associated with the item; and
  iteratively identifying one or more additional levels of keywords, wherein each of the additional levels of keywords are identified by:
    obtaining one or more new retailer identification numbers associated with one or more new items that are top clicked search results for keywords in a previous level; and
    identifying new keywords for a current level based on a relevant search history for the one or more new retailer identification numbers;
scrape current information from the webpage about the item;
select recommended keywords from the keyword universe to be inserted into different portions of the current information;
display a user interface in a condensed format such that the user interface partially overlays the webpage, the user interface comprising inputs that show the recommended keywords for the different portions, and that provide an ability to change which of the different portions are associated with the recommended keywords;
automatically generate a series of prompts for an artificial intelligence (AI) engine to rewrite the different portions based on the recommended keywords, the current information, and the inputs of the user interface; and
expand the user interface to overlay more of the webpage, and display rewritten information and the current information next to each other.

18. The computer-readable storage medium of claim 17, wherein the seed keyword is initially selected by the AI engine, and wherein the user interface provides an option for user input to override the seed keyword.

19. The computer-readable storage medium of claim 17, wherein automatically generate the series of prompts comprises providing product specific input including a desired voice.

20. The computer-readable storage medium of claim 17, wherein the instructions further configure the computer to automatically update or prompting a user to update the rewritten information based on a date change based on seasonal keywords.

* * * * *